US009164556B2

(12) United States Patent
Jiang

(10) Patent No.: US 9,164,556 B2
(45) Date of Patent: Oct. 20, 2015

(54) HEAT DISSIPATION DEVICE FOR A NOTEBOOK COMPUTER

(71) Applicant: Quatius Limited, Kowloon (HK)

(72) Inventor: Chao Jiang, Kowloon (HK)

(73) Assignee: Quatius Limited, Hong Kong (CN)

( * ) Notice: Subject to any disclaimer, the term of this patent is extended or adjusted under 35 U.S.C. 154(b) by 306 days.

(21) Appl. No.: 13/848,651

(22) Filed: Mar. 21, 2013

(65) Prior Publication Data

US 2014/0055946 A1    Feb. 27, 2014

(30) Foreign Application Priority Data

Aug. 27, 2012    (CN) ..................... 2012 2 0429524 U

(51) Int. Cl.
*H05K 7/20* (2006.01)
*G06F 1/20* (2006.01)
*H01L 23/473* (2006.01)

(52) U.S. Cl.
CPC . *G06F 1/20* (2013.01); *G06F 1/203* (2013.01)

(58) Field of Classification Search
CPC ............. H05K 7/20218–7/20381; H05K 7/20409–7/20418; H05K 7/20009–7/202; H01L 23/473; H01L 23/367–23/3677; H01L 23/46–23/467; F28F 3/02; F28F 13/06–13/125; G06F 1/20–1/203; G06F 1/181–1/182
USPC ......... 361/679.46–679.54, 688–723, 361/719–220, 676–678; 165/80.1–80.5, 165/104.33, 185; 174/15.1–15.3, 174/16.1–16.3, 547–548; 257/712–722, 257/E23.088; 24/453, 458–459
See application file for complete search history.

(56) References Cited

U.S. PATENT DOCUMENTS

| | | | | |
|---|---|---|---|---|
| 6,028,768 | A * | 2/2000 | Cipolla | 361/679.12 |
| 6,044,758 | A * | 4/2000 | Drake | 100/43 |
| 6,279,800 | B1 * | 8/2001 | Lee | 224/276 |
| 6,366,460 | B1 * | 4/2002 | Stone et al. | 361/679.47 |
| 7,151,667 | B2 * | 12/2006 | Walters et al. | 361/699 |
| 7,310,227 | B2 * | 12/2007 | Kusamoto et al. | 361/695 |
| 7,369,672 | B2 * | 5/2008 | Hirschhorn | 381/333 |
| 7,388,747 | B2 * | 6/2008 | Yang et al. | 361/700 |
| 7,532,463 | B2 * | 5/2009 | Jacobs et al. | 361/679.48 |
| 7,600,730 | B2 * | 10/2009 | Leung | 248/346.3 |
| 7,866,623 | B2 * | 1/2011 | Lampman et al. | 248/551 |
| 8,322,290 | B1 * | 12/2012 | Mignano | 108/9 |
| 8,453,981 | B2 * | 6/2013 | Suckle | 248/127 |
| 2007/0058329 | A1 * | 3/2007 | Ledbetter et al. | 361/681 |
| 2008/0316692 | A1 * | 12/2008 | Jacobs et al. | 361/683 |
| 2009/0127418 | A1 * | 5/2009 | Wang | 248/310 |
| 2009/0159769 | A1 * | 6/2009 | Lee | 248/310 |

(Continued)

*Primary Examiner* — Anthony Haughton
*Assistant Examiner* — Razmeen Gafur
(74) *Attorney, Agent, or Firm* — Davis Wright Tremaine LLP

(57) ABSTRACT

A heat dissipation device for a notebook computer is disclosed. The heat dissipation device includes a base, a connection device and a bracket. The connection device includes a first connecting member and a second connecting member which can be detachably connected with the first connecting member. The bracket is pivotally connected with the base through the connection device. The first connecting member is provided on the base, and the second connecting member is fixed on the bracket. The bracket is regulated by controlling engagement and separation of the first connecting member and the second connecting member, achieving stepless adjustment of the tilt angle of the heat dissipation device for a notebook computer, and the adjustment will be more convenient. Furthermore, the bracket is locked by the engagement of the first connecting member and the second connecting member, and it is of better stability.

8 Claims, 5 Drawing Sheets

(56) References Cited

U.S. PATENT DOCUMENTS

| | | | |
|---|---|---|---|
| 2009/0179121 A1* | 7/2009 | Lindblad et al. | 248/123.11 |
| 2010/0096517 A1* | 4/2010 | Lampman et al. | 248/125.7 |
| 2010/0213330 A1* | 8/2010 | Downing | 248/176.3 |
| 2010/0231102 A1* | 9/2010 | Block et al. | 312/249.8 |
| 2011/0036958 A1* | 2/2011 | Moore | 248/188.1 |
| 2011/0048597 A1* | 3/2011 | Ho | 150/165 |
| 2011/0133050 A1* | 6/2011 | Eisenberger et al. | 248/551 |
| 2011/0315733 A1* | 12/2011 | White | 224/600 |

* cited by examiner

HEAT DISSIPATION DEVICE FOR A NOTEBOOK COMPUTER

FIELD OF THE INVENTION

The present invention relates to notebook computer auxiliary peripherals, more particularly to a heat dissipation device for a notebook computer.

BACKGROUND OF THE INVENTION

With the fast development of internet, the computer has been widely used. A notebook computer is commonly called laptop computer, which is popular in the business group, student group, etc., due to its small size, light weight and convenience for carrying.

With the fast development of internet, the computer has been widely used. A notebook computer is commonly called laptop computer, which is popular in the business group, student group, etc., due to its small size, light weight and convenience for carrying.

However, the notebook computer will generate a lot of heat after long-term use, and if the heat is not timely dissipated, the temperature of the interior system will increase with the increasing of the using time, which will affect the functions of the notebook computer, resulting in for example slow running, sudden crashing, etc. Therefore, how to dissipate the heat becomes the key issue of the notebook computer. The heat dissipation of the notebook computer generally depends on the radiator or heat dissipating plate, and it mainly depends on elevating the notebook computer and/or installing heat dissipating fans under the heat dissipating plate to improve the heat radiation function.

Elevating the notebook computer is mainly to promote air circulating and heat radiating to achieve the heat dissipating effect. In the traditional heat dissipation device for a notebook computer, it is mainly by adjusting locking steps and a positioning block to control the tilt angles of the heat dissipation device for a notebook computer. Such heat dissipation device for a notebook computer is of good stability, but its structure is complex and not convenient in regulating operation. A further heat dissipation device for a notebook computer is to engage the base of the heat dissipation device for a notebook computer by a rotating shaft. This kind of heat dissipation device is with simple structure, but it is lack of stability.

SUMMARY OF THE INVENTION

Based on the above, directing to the issue of inconvenient adjustment and the lack of stability, there is a need to provide a new heat dissipation device for a notebook computer.

A heat dissipation device for a notebook computer includes a base, a connection device and a bracket. The connection device includes a first connecting member and a second connecting member which can be detachably connected with the first connecting member. The bracket is pivotally connected with the base through the connection device. The first connecting member is provided on the base, and the second connecting member is fixed on the bracket.

In one embodiment, the first connecting member is movably provided on the base, and a locking member is provided at a position where the first connecting member is contacted with the second connecting member; and the second connecting member is provided with a locking slot to accommodate the locking member.

In one embodiment, the first connecting member is slidably assembled on the base, and the slide direction of the first connecting member is the axial direction of the pivoting axis of the bracket, and the locking member is protruded from an end surface of the first connecting member; and the second connecting member is provided on center of the pivoting axis of the bracket, and the locking slot is provided on the end surface of the second connecting member opposite to the first connecting member.

In one embodiment, the connection device further includes a push-pull device which pulls the first connecting member away from the second connecting member, and the push-pull device is connected with the first connecting member.

In one embodiment, the push-pull device includes a button and a button connecting rod, and the button is connected with the first connecting member by the button connecting rod.

In one embodiment, the push-pull device is further provided with a flexible return device to keep the engagement of the first connecting member and the second connecting member.

In one embodiment, the base is provided with a USB port and a power interface.

In one embodiment, the base of the heat dissipating plate is provided with a convex bracket, and two ends of the convex bracket are fixed on the base.

In one embodiment, the bracket is provided with anti-slip pads.

In the above mentioned heat dissipation device, the bracket is regulated by controlling engagement and separation of the first connecting member and the second connecting member, to realize the adjustment of tilt angle of the heat dissipation device. When the first connecting member and the second connecting member are separated from each other, the bracket is freedom of movement, and the angle of the bracket can be regulated randomly. When the first connecting member and the second connecting member are engaged with each other, the bracket is locked, such that the heat dissipation device presents a certain angle of inclination. The heat dissipation device for a notebook computer in present invention achieves the stepless adjustment of the tilt angle of the heat dissipation device by the engagement and separation of the first connecting member and the second connecting member, and it is more convenient in adjustment. Furthermore, the bracket is locked by the engagement of the first connecting member and the second connecting member, thereby it is of better stability.

DETAILED DESCRIPTION OF THE PREFERRED EMBODIMENTS

Figure 1:
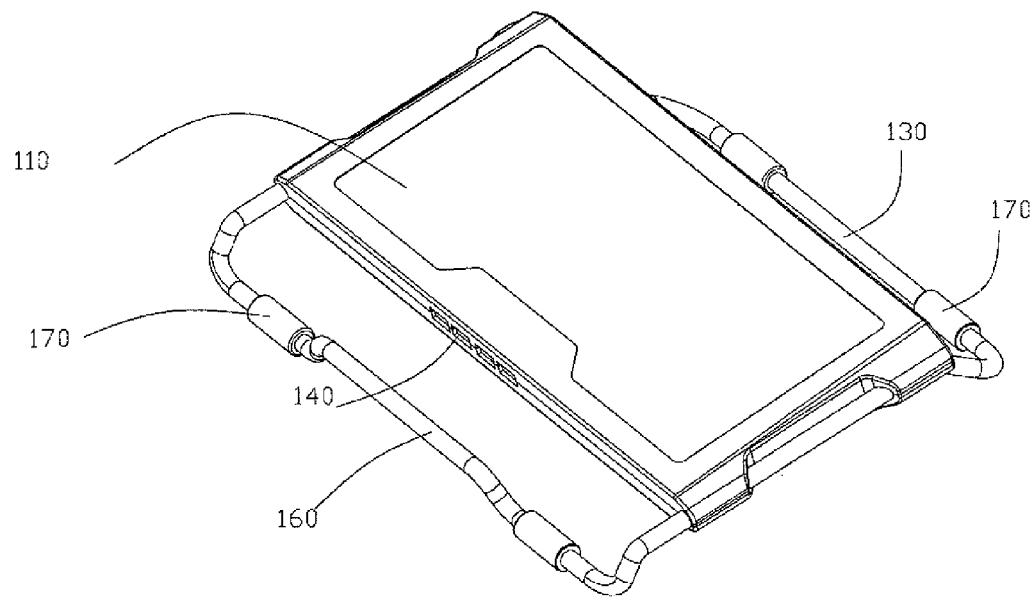
FIG. 1 shows a structural schematic diagram of the heat dissipation device for a notebook computer.
Figure 2:
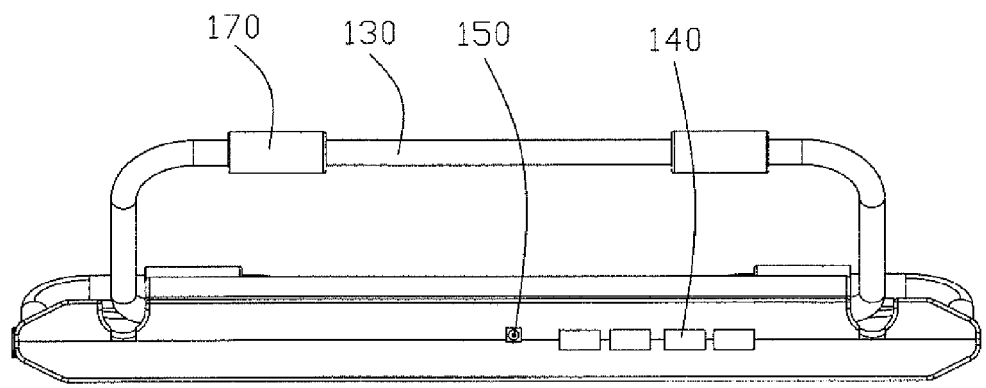
FIG. 2 shows a structural schematic diagram of the heat dissipation device for a notebook computer in another view.
Figure 3:
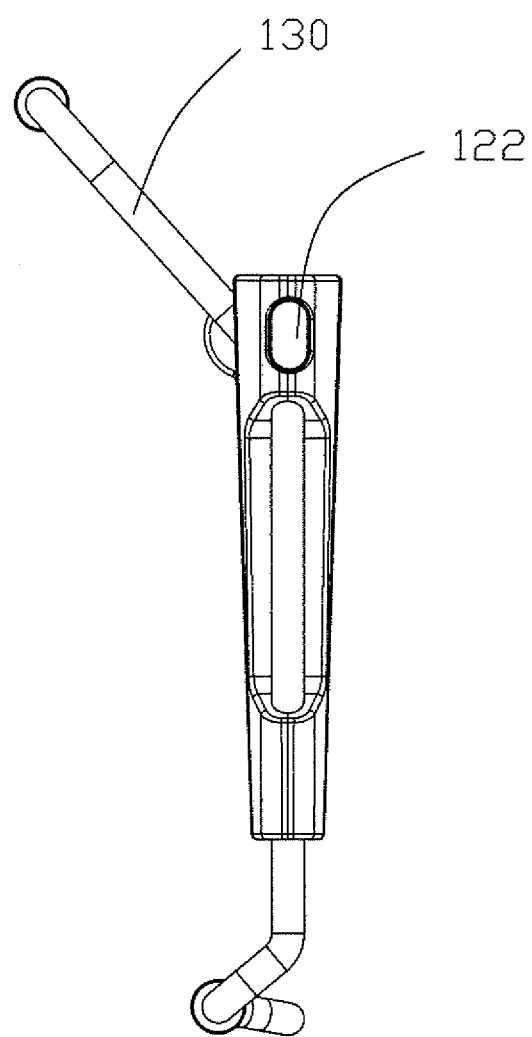
FIG. 3 shows a structural schematic diagram of the heat dissipation device for a notebook computer in another view.

The invention will be further described with reference to the accompanying drawings and embodiments.

As illustrated in FIGS. 1 to 5, in the first embodiment, a heat dissipation device for a notebook computer includes a base 110, a connection device 120 and a bracket 130. The connection device 120 includes a first connecting member 122 and a second connecting member 124 which can be detachably connected with the first connecting member 122. The bracket 130 is pivotally connected with the base 110 through the connection device 120. The first connecting member 122 is provided on the base 110, and the second connecting member 124 is fixed on the bracket 130.

In the above mentioned heat dissipation device for a notebook computer, the bracket 130 is regulated by controlling the engagement and separation of the first connecting member 122 and the second connecting member 124, to achieve the adjustment of the tilt angle of the heat dissipation device. When the first connecting member 122 and the second connecting member 124 are separated from each other, the bracket 130 is in freedom of movement, and the angle of the bracket can be regulated randomly. When the first connecting member 122 and the second connecting member 124 are engaged with each other, the bracket 130 is locked, such that the heat dissipation device for a notebook computer shows a certain angle of inclination. The heat dissipation device achieves the stepless adjustment of the tilt angle of the heat dissipation device by the engagement and separation of the first connecting member 122 and the second connecting member 124, which is more convenient in adjustment. Furthermore, the bracket 130 is locked by the engagement of the first connecting member 122 and the second connecting member 124, and thus it is better in stability.

In this embodiment, the first connecting member 122 can be a male connector, and correspondingly, the second connecting member 124 can be a female connector. Certainly, the first connecting member 122 can be a female connector, and the second connecting member 124 can be a male connector. Both of these ways can achieve the engagement and separation of the first connecting member 122 and the second connecting member 124.

For example, the first connecting member 122 is a male connector, and there is provided a locking member at a position where the first connecting member 122 is contacted with the second connecting member 124. The second connecting member 124 is provided with a locking slot to accommodate the locking member. When the first connecting member 122 is contacted with the second connecting member 124, the locking member is inserted into the locking slot, such that the first connecting member 122 and the second connecting member 124 are engaged to connect with each other, thereby the second connecting member 124 is restricted without rotating, thus fixed the position of the bracket 130. When the locking member is released from the locking slot, the first connecting member 122 and the second connecting member 124 are separated from each other, and the second connecting member 124 can be rotated together with the bracket 130, thereby the bracket 130 can be regulated to a suitable position.

Figure 4:
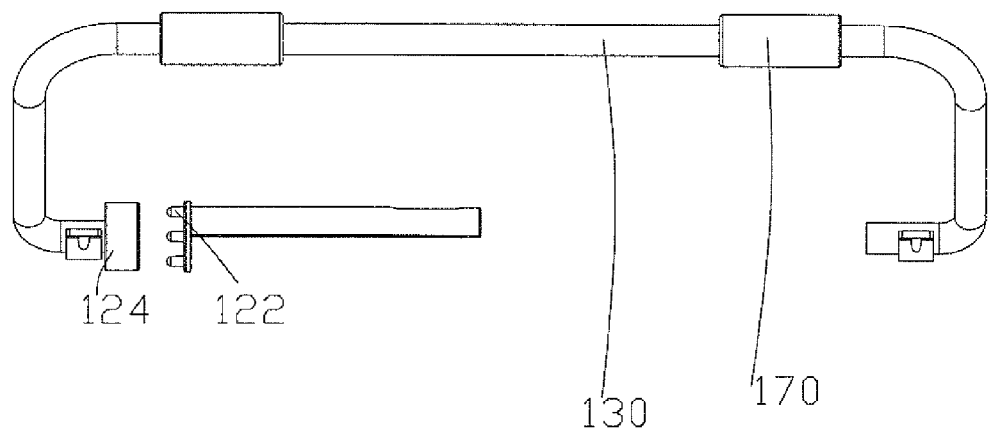
FIG. 4 shows a schematic diagram of the connection device in release state of the heat dissipation device for a notebook computer according to a first embodiment.
Figure 5:
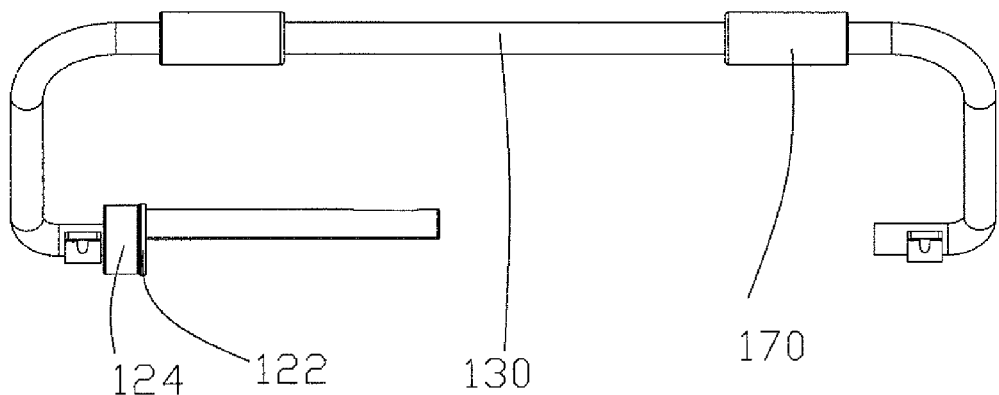
FIG. 5 shows a schematic diagram of the connection device in locked state of the heat dissipation device for a notebook computer according to the first embodiment.

As illustrated in FIG. 4, in this embodiment, the first connecting member 122 is slidably provided on the base 110, and the slide direction of the first connecting member 122 is the axial direction of the pivoting axis of the bracket 130, and the locking member is convexly located on end surface of the first connecting member 122. The second connecting member 124 is provided on the center of the pivoting axis of the bracket 130, and the locking slot is provided on the end surface of the second connecting member 124 opposite to the first connecting member 122. The separation and engagement of the first connecting member 122 and the second connecting member 124 is achieved by axial direction sliding of the first connecting member 122 along the pivoting axis of the bracket 130. Certainly, it should be understood that in other embodiments, if the first connecting member 122 is fixed on the base 110, then the second connecting member 124 could slide along the axial direction of the pivoting axis of the bracket 130, which also realize the separation and engagement of the first connecting member 122 and the second connecting member 124.

It should also be understood that the locking member is provided on the end surface of the first connecting member 122, and the locking slot is provided on the end surface of the second connecting member 124, which is only one embodiment but not a necessary means to achieve the separation and engagement of the first connecting member 122 and the second connecting member 124. For example, in other embodiments, if the locking slot is provided on the peripheral surface of the second connecting member 124, and the first connecting member 122 is moved along the axial direction perpendicular to the pivoting axis of the bracket 130, it can also achieve the separation and engagement of the first connecting member 122 and the second connecting member 124.

In one embodiment, the connection device 120 further includes a push-pull device 126 which is connected with the first connecting member 122. External force could be easily transmitted to the first connecting member 122 by the push-pull device 126, to achieve the engagement and separation of the first connecting member 122. It should be noted that, even if there is not provided with the push-pull device 126, the engagement and separation of the first connecting member 122 and the second connecting member 124 could also be realized, for example, directly toggling the first connecting member 122 to achieve the engagement and separation of the first connecting member 122 and the second connecting member 124, therefore the push-pull device 126 is not a must.

Figure 6:
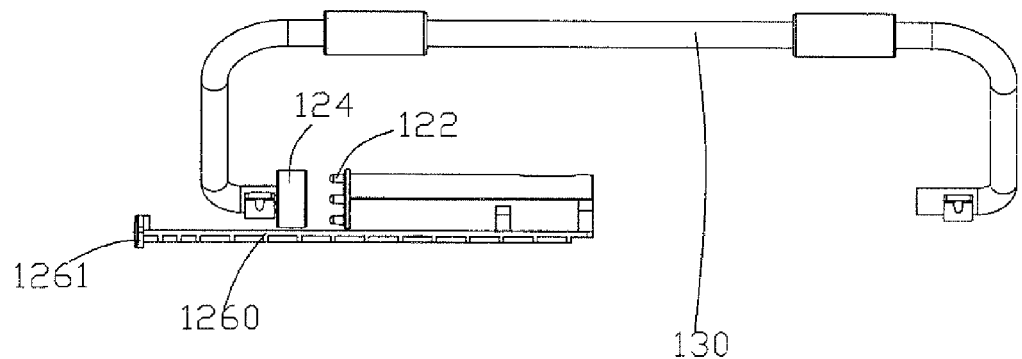
FIG. 6 shows a schematic diagram of the connection device in release state of the heat dissipation device for a notebook computer according to a second embodiment.
Figure 7:
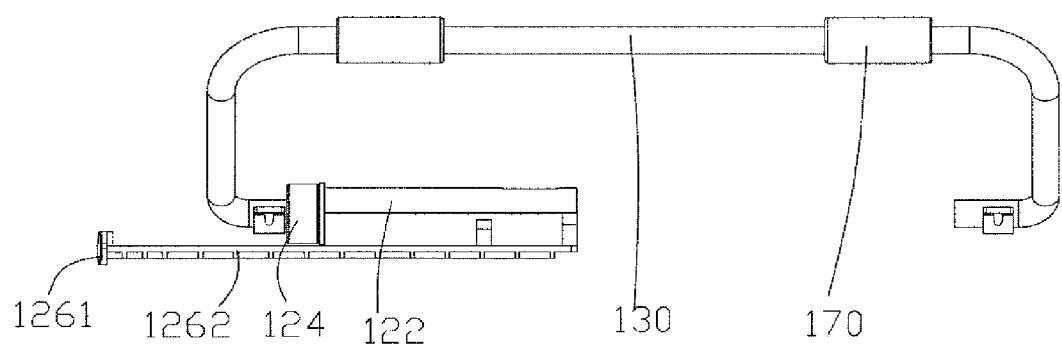
FIG. 7 shows a schematic diagram of the connection device in locked state of the heat dissipation device for a notebook computer according to the second embodiment.

As illustrated in FIGS. 6 and 7 of the second embodiment, the difference from the first embodiment is that the push-pull device 126 includes a button 1261 and a button connecting rod 1262, and the button 1261 is connected with the first connecting member 122 by the button connecting rod 1262. By pushing the button 1261, the button is under stress, and the pressure is transmitted to the first connecting member 122 by the button connecting rod 1262, to separate the first connecting member 122 from the second connecting member 124, and at this time the bracket 130 can be freely rotated. When the bracket 130 is rotated to a certain angle, the button 1261 is pulled, and the pulling force is transmitted to the first connecting member 122 by the button connecting rod 1262, making the first connecting member 122 and the second connecting member 124 engaged with each other, and at this time the bracket 130 is locked and presents a tilt angle. In the embodiment, the engagement and separation of the first connecting member 122 and the second connecting member 124 are controlled by the button 1261 and the button connecting rod 1262, to realize the stepless adjustment of the tilt angle of the heat dissipation device, which is more convenient in control. It should be noted that, the button 1261 and the button connecting rod 1262 are not necessary to achieve the engagement and separation of the first connecting member 122 and the second connecting member 124, and the engagement and separation could also be achieved by directly pushing or pulling the bracket 130 from its side surface.

The rest of this embodiment is the same with that of the first embodiment.

Figure 8:
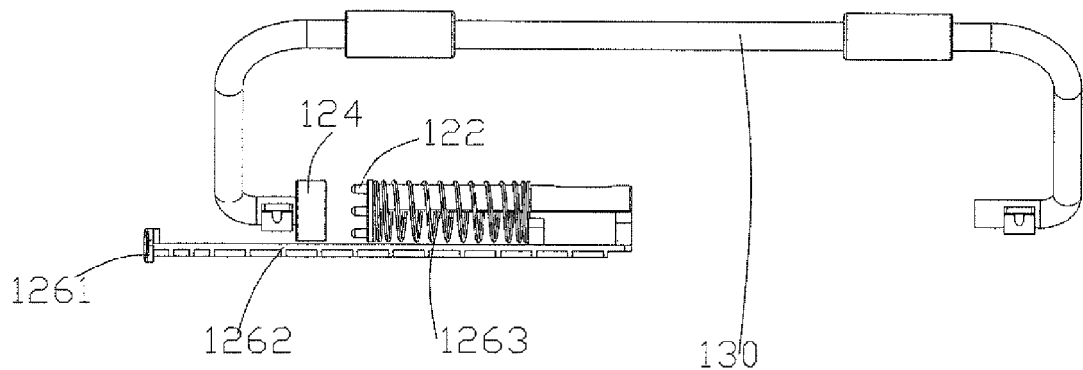
FIG. 8 shows a schematic diagram of the connection device in release state of the heat dissipation device for a notebook computer according to a third embodiment.
Figure 9:
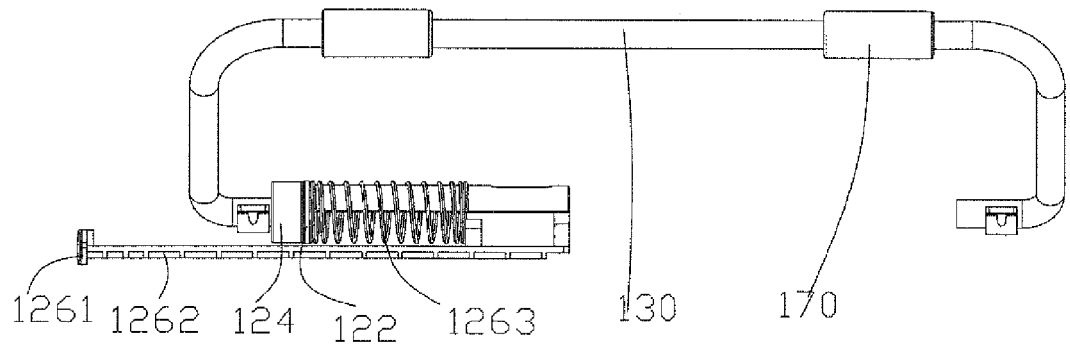
FIG. 9 shows a schematic diagram of the connection device in locked state of the heat dissipation device for a notebook computer according to the third embodiment.

As illustrated in FIGS. 8 and 9 of the third embodiment, the difference from the second embodiment is that, a flexible return device 1263 is provided between the first connecting member 122 and the button connecting rod 1262 to maintain the first connecting member 122 and the second connecting member 124 to be engaged with each other. The flexible return device 1263 is deformed under external force, and when the external force is removed, the flexible return device 1263 could return its original state. When push the button 1261, pressure is transmitted by the button connecting rod 1262 to the flexible return device 1263, which in turn separate the first connecting member 122 from the second connecting member 124 under pressure, and at this time it is under release state. Since the flexible return device 1263 has reset function, and when the pressure is removed, the flexible return device 1263 could drive the first connecting member 122, the button connecting rod 1262 and the button 1261 to recover the locked state, realizing the engagement of the first connecting member 122 and the second connecting member 124. It should be noted that when release the button 1261, automatic engagement of the first connecting member 122 and the second connecting member 124 could be achieved by the flexible return device 1263, for further facilitating the control, but it is not a must in order to realize the engagement and separation of the first connecting member 122 and the second connecting member 124. The flexible return device 1263 can be a spring, a twisting spring, an elastic rope, etc.

The rest of this embodiment is the same with that of the second embodiment.

In one embodiment, the connection device 120 is hided in the interior of the base 110, occupying a smaller space, at the same time which could prevent dust from entering the connection device 120 to influence the engagement effect. It should be understood that the connection device 120 is not necessary to be hided in the interior of the base 110, which also could be exposed outside of the base, reducing manufacturing procedure.

In one embodiment, the base 110 is provided with a USB port 140 and a power interface 150, which provides more USB ports for use. Meanwhile, a plurality of USB port 140 is provided on the base, thereby there is no need to provide an additional USB hub. This makes it easier to connect notebook computer accessories, which solves the problem that heat dissipation device occupies the position of the USB port 140 and causes insufficient number of the port in use. The power interface 150 enables the heat dissipation device to be capable of being directly connected with the power by a plug, or being connected with the computer with a USB data line.

In one embodiment, the base 110 of the heat dissipation device is provided with a convex bracket 160, and both ends of the convex bracket 160 are fixed on the base 110. When the tilt angle of the base is higher, the convex part can provide a blocking force, which could effectively prevent the notebook computer from slipping down. It could be understood that, when there is no the convex bracket 160, because of the frictional resistance exists between the notebook computer and the base 110 of the heat dissipation device for a notebook computer, it also could prevent the notebook computer from slipping.

In one embodiment, the bracket 130 is provided with anti-slip pads 170. It should be understood that, the anti-slip pads 170 can surround the bracket 130 as illustrated in FIG. 1, or wrap the entire exposed bracket 130. When the heat dissipation device is put on a desk, on a bed or on the ground, the anti-slip pads 170 creates greater friction, which resist easy movement of the heat dissipation device. It should be noted that, the function of the anti-slip pads 170 is to increase the friction between the bracket 130 and supporting surface, but this is not a must in order to solve the problem of stepless adjustment of the tilt angle.

In one embodiment, the bracket 130 is a metal bracket, which has better heat transfer performance and better heat dissipation. It should be understood that the bracket 130 can also be other materials, such as plastics, wood materials etc.

The above embodiments only show several execution means of the present invention, which describes more specific and detailed, but it should not be understood that the embodiments will limit the scope of the present invention. It should be noted that, for the skilled person, several modifications and improvements could be made without departing from the spirit of the present invention, which are under the scope of the present invention. Therefore, the scope of the present invention is according to the appended claims.

What is claimed is:

1. A heat dissipation device for a notebook computer, comprising:
    a base;
    a connection device, comprising a first connecting member and a second connecting member detachable connected with the first connecting member; and
    a bracket, pivotally connected with the base through the connection device;
    wherein the first connecting member is set on the base, the second connecting member is fixed on the bracket, and the first connecting member is movably provided on the base, and a locking member is provided at a position where the first connecting member is contacted with the second connecting member; and the second connecting member is provided with a locking slot to accommodate the locking member.

2. The heat dissipation device according to claim 1, wherein the first connecting member is slidably assembled on the base, and the slide direction of the first connecting member is the axial direction of the pivoting axis of the bracket, and the locking member is protruded from an end surface of the first connecting member; and the second connecting member is provided on center of the pivoting axis of the bracket, and the locking slot is provided on the end surface of the second connecting member opposite to the first connecting member.

3. The heat dissipation device according to claim 1, wherein the connection device further includes a push-pull device which pulls the first connecting member away from the second connecting member, and the push-pull device is connected with the first connecting member.

4. A heat dissipation device for a notebook computer, comprising:
    a base;
    a connection device, comprising a first connecting member and a second connecting member detachable connected with the first connecting member; and
    a bracket, pivotally connected with the base through the connection device;
    wherein the first connecting member is set on the base, the second connecting member is fixed on the bracket, wherein the connection device further includes a push-pull device which pulls the first connecting member away from the second connecting member, and the push-pull device is connected with the first connecting member, wherein the push-pull device includes a button and a button connecting rod, and the button is connected with the first connecting member by the button connecting rod.

5. The heat dissipation device according to claim 4, wherein the push-pull device is further provided with a flexible return device to keep the engagement of the first connecting member and the second connecting member.

6. The heat dissipation device according to claim 1, wherein the base is provided with a USB port and a power interface.

7. The heat dissipation device according to claim 6, wherein the heat dissipating plate is provided with a convex bracket, and both ends of the convex bracket are fixed on the base.

8. The heat dissipation device according to claim 6, wherein the bracket is provided with anti-slip pads.

\* \* \* \* \*